United States Patent
Van Hooren et al.

(10) Patent No.: US 12,442,469 B2
(45) Date of Patent: Oct. 14, 2025

(54) FLUID HOSE WITH A SURFACE MODIFIYING SUBSTANCE

(71) Applicant: Veritas AG, Gelnhausen (DE)

(72) Inventors: Marc Van Hooren, Freigericht (DE); Michael Rosemann, Hasselroth (DE)

(73) Assignee: Veritas AG, Gelnhausen (DE)

( * ) Notice: Subject to any disclaimer, the term of this patent is extended or adjusted under 35 U.S.C. 154(b) by 452 days.

(21) Appl. No.: 18/104,604

(22) Filed: Feb. 1, 2023

(65) Prior Publication Data
US 2023/0250901 A1    Aug. 10, 2023

(30) Foreign Application Priority Data
Feb. 8, 2022    (DE) .................. 10 2022 102 899.2

(51) Int. Cl.
*F16L 11/08*    (2006.01)
*F16L 11/04*    (2006.01)
*F16L 11/12*    (2006.01)

(52) U.S. Cl.
CPC ............. *F16L 11/086* (2013.01); *F16L 11/12* (2013.01); *B32B 2597/00* (2013.01); *F16L 11/04* (2013.01); *F16L 11/085* (2013.01)

(58) Field of Classification Search
CPC ........ B32B 1/08; B32B 2597/00; F16L 11/04; F16L 11/08; F16L 11/085; F16L 11/12
See application file for complete search history.

(56) References Cited

U.S. PATENT DOCUMENTS

| | | | |
|---|---|---|---|
| 9,629,946 B2* | 4/2017 | Johansson | B29C 70/68 |
| 10,240,067 B2* | 3/2019 | Kim | B32B 25/10 |
| 10,961,413 B2* | 3/2021 | Kim | C09D 183/04 |
| 11,421,099 B2* | 8/2022 | Coe | C08L 19/003 |
| 11,542,409 B2* | 1/2023 | Kim | B32B 25/04 |
| 12,065,556 B2* | 8/2024 | Coe | B32B 27/08 |
| 2003/0215589 A1* | 11/2003 | Merical | F24F 13/0218 |
| | | | 428/36.9 |
| 2005/0191355 A1* | 9/2005 | Foss | B32B 27/18 |
| | | | 424/618 |
| 2007/0196605 A1* | 8/2007 | Ong | F16L 11/12 |
| | | | 523/122 |
| 2007/0196607 A1* | 8/2007 | Ong | B32B 27/08 |
| | | | 428/36.9 |

(Continued)

FOREIGN PATENT DOCUMENTS

CN    113217716 A    8/2021
WO    WO 2012/036618 A1    3/2012

*Primary Examiner* — Nicholas L Foster
(74) *Attorney, Agent, or Firm* — Holland & Hart LLP (57) ABSTRACT

The present application relates to a fluid hose for conducting fluid, wherein the fluid hose is adapted as an at least two-layer fluid hose, which comprises an inner hose layer and an outer hose layer, wherein the inner hose layer encloses an interior of the fluid hose for receiving fluid, wherein the inner hose layer comprising an inner surface facing the interior of the fluid hose, wherein the inner hose layer is formed from a plastic, wherein a surface-modifying substance is embedded within the plastic in a diffusion-resistant manner; and wherein the surface-modifying substance is adapted to change a surface property of the inner surface of the inner hose layer, in order to prevent colonization of the inner surface by microorganisms.

15 Claims, 9 Drawing Sheets

(56) References Cited

U.S. PATENT DOCUMENTS

| | | | |
|---|---|---|---|
| 2008/0032119 A1* | 2/2008 | Feldhahn | A61M 16/0638 428/332 |
| 2011/0236615 A1* | 9/2011 | Hendel | F16L 9/12 977/773 |
| 2013/0273286 A1* | 10/2013 | Luo | C08L 81/02 524/502 |
| 2013/0280471 A1* | 10/2013 | Johansson | A61L 29/16 427/240 |
| 2016/0128334 A1 | 5/2016 | Poston | |
| 2016/0245432 A1* | 8/2016 | Fonfara | F16L 11/24 |
| 2018/0237659 A1* | 8/2018 | Kim | C08G 77/28 |
| 2018/0327684 A1* | 11/2018 | Kim | B32B 27/283 |
| 2019/0118502 A1* | 4/2019 | Rosemann | B32B 25/042 |
| 2021/0179889 A1* | 6/2021 | Kim | B32B 25/20 |
| 2021/0230407 A1* | 7/2021 | Coe | B32B 27/18 |
| 2022/0089105 A1* | 3/2022 | Reddy | B32B 27/304 |
| 2022/0372257 A1* | 11/2022 | Coe | C08K 5/09 |
| 2023/0374260 A1* | 11/2023 | Smith | B32B 27/18 |
| 2025/0051556 A1* | 2/2025 | Coe | C08J 3/24 |

\* cited by examiner

FLUID HOSE WITH A SURFACE MODIFYING SUBSTANCE

CROSS-REFERENCE

The present application claims the benefit of German Patent Application No. 10 2022 102 899.2 by Van Hooren et al., entitled "FLUIDSCHLAUCH MIT EINER OBERFLÄCHENMODIFIZIERENDEN SUBSTANZ", filed Feb. 8, 2022, which is assigned to the assignee hereof and is incorporated by reference in its entirety.

TECHNICAL FIELD

The present application relates to a fluid hose with a surface-modifying substance. The present application relates in particular to a fluid hose with an inner hose layer which encloses an interior of the fluid hose for receiving fluid, wherein the inner hose layer is formed from a plastic in which the surface-modifying substance is embedded in a diffusion-resistant manner.

BACKGROUND

Conventional fluid hoses are used in a variety of domestic and industrial applications. In conventional fluid hoses, the problem often arises that a biofilm can form on the inner surface of the hose wetted with the fluid. Such a biofilm is formed by microorganisms such as bacteria, algae, fungi, viruses and/or protozoa, which colonize the inner surface of the hose and impair the quality of the fluid conducted in the fluid hose.

Corresponding conventional fluid hoses can be adapted as water hoses, in particular drinking water hoses, for conducting water, in particular drinking water, in which case the formation of a biofilm can under certain circumstances significantly impair the quality of the drinking water that is conducted.

When using biocides to impair the formation of a biofilm, however, there are significant restrictions with regard to the permissible release concentration of the corresponding biocides into the piped water due to the biocide regulations relevant to the use of water hoses. The biocide regulations sets very high standards for drinking water hoses in particular, which often completely prevents or significantly impairs the use of biocides in drinking water hoses.

For example, the use of silver as a biocide in drinking water hoses is prohibited under the drinking water regulation due to the release of silver, which is toxic to humans, into the drinking water passed through the drinking water hoses. Document EP 1 759 140 B1 discloses the use of silver as a biocide in a shower hose. Document DE 422 6810 C1 discloses the use of silver as a biocide in hoses for medical needs. Document EP 1 450 124 A2 discloses a hose with silver as a biocide. Document EP 2 077 976 B1 describes a bioactive ruthenium-containing coating.

SUMMARY

It is the object of the application to provide a fluid hose in which the formation of biofilm in the fluid hose is impaired and in which the release of biocides to the fluid conducted through the fluid hose is prevented.

This object is solved by the objects with the features according to the independent claims. Examples of the application are the subject of the figures, the description and the dependent claims.

According to a first aspect of the application, the object is solved by a fluid hose for conducting fluid, wherein the fluid hose is adapted as an at least two-layer fluid hose, which comprises an inner hose layer and an outer hose layer, wherein the inner hose layer encloses an interior of the fluid hose for receiving fluid, wherein the inner hose layer comprises an inner surface facing the interior of the fluid hose, wherein the inner hose layer is formed from a plastic, wherein a surface-modifying substance is embedded within the plastic in a diffusion-resistant manner, and wherein the surface-modifying substance is adapted to change a surface property of the inner surface of the inner hose layer, in order to prevent colonization of the inner surface by microorganisms.

The fluid hose is adapted in particular for conducting aqueous fluid, in particular water. In particular, the fluid hose is shaped as a drinking water hose, which is adapted to conduct drinking water.

The fluid hose can be used in a large number of applications in the private and industrial sectors, in particular in the area of service water supply, drinking water supply, service water drainage and water treatment.

The fluid hose can in particular also be embodied as a vehicle fluid hose which is arranged in a vehicle, wherein the vehicle fluid hose is arranged in particular in a water injection system for injecting water into an internal combustion engine of the vehicle, or wherein the vehicle fluid hose is arranged in particular in a battery temperature control system for temperature control of an electric vehicle battery of an electric vehicle.

In particular, the fluid hose is adapted as a flexibly deformable fluid hose, in particular a fluid hose that is flexibly deformable in all three spatial directions.

In particular, the outer hose layer of the fluid hose is arranged radially outside of the inner hose layer within the fluid hose.

The diffusion-resistant surface-modifying substance embedded within the plastic of the inner hose layer of the fluid hose is adapted to change a surface property of the inner surface of the inner hose layer in order to prevent, in particular significantly reduce, colonization of the inner surface of the inner hose layer by microorganisms.

As a result, the surface property of the inner surface of the inner hose layer, which is changed by the surface-modifying substance, impairs microorganisms present on the inner surface of the inner hose layer, such as bacteria, algae, fungi, viruses and/or protozoa. By the changed surface properties of the inner surface of the inner hose layer the binding, in particular adhesion, of the microorganisms to the inner surface of the inner hose layer can be impaired and/or microorganisms adhering to the inner surface of the inner hose layer can be impaired, in particular killed or inactivated.

This achieves the technical advantage that the formation of a biofilm formed by microorganisms on the inner surface of the inner hose layer is prevented, or the amount of biofilm formed can be significantly reduced in order to prevent contamination of the fluid, in particular water, conducted through the fluid hose.

The surface-modifying substance comprises in particular a surface-polarizing substance which is adapted to change a polarization of the inner surface of the inner hose layer in order to prevent, in particular significantly reduce, colonization of the inner surface of the inner hose layer by microorganisms.

Changing the polarization of the inner surface of the inner hose layer made of plastic changes the distribution of charges, in particular positive and negative charges, on the inner surface of the inner hose layer, by which microorganisms adhering to the inner surface of the inner hose layer can be polarized, in particular by transferring the charges from the polarized inner surface of the inner hose layer on the microorganisms. By the corresponding polarization binding, in particular adhesion, of the microorganisms to the inner surface can be impaired, or the microorganisms on the inner surface can be impaired, in particular killed or inactivated.

Furthermore, the surface-modifying, in particular surface-polarizing, substance is embedded in a diffusion-stable manner within the plastic of the inner hose layer, so that diffusion of the surface-modifying substance from the plastic of the inner hose layer into the fluid is prevented, in particular significantly reduced. Thus, the surface-modifying substance cannot be released into the fluid during operation of the fluid hose, or only to an extremely small extent, which enables the fluid hose according to the present application to be used as a drinking water line.

This achieves the technical advantage that accumulation of the surface-modifying substance in the fluid conducted through the fluid hose is avoided. Thus, according to a European guideline, a surface-modifying substance embedded within the plastic that is diffusion-resistant according to the present disclosure is not considered as a biocide, so that regulatory simplifications result in the approval of a corresponding fluid hose, in particular a drinking water hose, since the corresponding biocide regulation does not apply here.

In addition, by the diffusion-stable embedding of the surface-modifying substance in the inner layer of the fluid hose it is ensured that the concentration of the surface-modifying substance within the plastic of the inner hose layer is not reduced or is only reduced in an extremely small extent during operation of the fluid hose, so that the surface modifying properties of the surface-modifying substance can be maintained for a long period of time, in particular for several years.

In an example, the surface-modifying substance comprises a surface-polarizing substance which is adapted to change a polarization of the inner surface of the inner hose layer in order to prevent colonization of the inner surface by microorganisms, wherein the surface-polarizing substance in particular comprises a sterion substance.

This achieves the technical advantage that the surface-polarizing substance, in particular sterion substance, allows for maintaining a changed polarization of the inner surface of the inner hose layer that is disadvantageous for the microorganisms for a long period of operation of the fluid hose without the surface-polarizing substance, in particular sterion substance, being released into the fluid in the fluid hose, or the release being significantly reduced.

Here, the surface-polarizing substance, in particular sterion substance, can be adapted to cause a bipolar surface polarization of the inner surface of the inner hose layer in order to prevent, in particular significantly reduce, colonization of the inner surface by microorganisms.

A changed polarization, in particular bipolar surface polarization, of the inner surface causes a change in the distribution of charges, in particular positive and negative charges, on the inner surface of the inner hose layer, which can be transferred to microorganisms on the inner surface and thereby polarize the cellular surface of the microorganisms. As a result, the binding of the microorganisms to the inner surface of the inner hose layer can be impaired and/or the microorganisms can be impaired, in particular killed or inactivated, as a result of which the biofilm formation on the inner surface of the inner hose layer is impaired.

In an example, the surface-modifying substance, in particular surface-polarizing substance, comprises an organometallic compound, wherein the organometallic compound in particular comprises a copper thiolate compound.

This achieves the technical advantage that the use of an organometallic compound enables a polarization of the inner surface of the inner hose layer.

An organometallic compound in this case includes in particular a metal, in particular a transition metal, in particular copper, which provides a positive partial charge in the organometallic compound, and one or a plurality of organic ligands which provide negative partial charges in the organometallic compound in order to achieve an effective polarization of the inner surface of the inner hose layer.

The at least one organic ligand of the organometallic compound can in particular include heteroatoms, such as sulfur, nitrogen and/or oxygen, which provide a partial negative charge in the organometallic compound.

The at least one organic ligand of the organometallic compound can comprise a hydrocarbon compound having at least one heteroatom, in particular sulfur, nitrogen and/or oxygen. In particular, the at least one organic ligand of the organometallic compound comprises a thiolate compound.

In particular, the organometallic compound is a copper thiolate compound, which is arranged in particular on a barium sulfate substrate.

In an example, the surface-modifying substance, in particular surface-polarizing substance, in the inner hose layer is present in a concentration range from 0.01 wt.-% to 1 wt.-%, in particular from 0.025 wt.-% to 0.1 wt.-%.

This achieves the technical advantage that the microorganisms adhering to the inner surface of the inner hose layer are sufficiently impaired by the claimed concentration ranges of the surface-modifying substance. In particular, the concentration of the surface-modifying substance, in particular surface-polarizing substance, in the inner hose layer is 0.045 wt.-%.

The concentration data relate here to the weight of the surface-modifying substance, in particular surface-polarizing substance, in particular the organometallic compound, in the inner hose layer of the fluid hose in relation to the sum of the weight of the plastic and the weight of the surface-modifying substance in the inner hose layer.

In an example, the surface-modifying substance is embedded in the entire inner hose layer made of plastic, or the surface-modifying substance is embedded in an area of the inner hose layer made of plastic that faces the inner surface, wherein the area in particular is limited by the inner surface and extends from the inner surface towards the outer hose layer.

This achieves the technical advantage that embedding the surface-modifying substance in the entire inner hose layer made of plastic enables the fluid hose to be produced in a particularly simple and cost-effective manner.

If, on the other hand, the surface-modifying substance is only embedded in the area of the inner hose layer facing the inner surface, a targeted introduction of the surface-modifying substance in the spatial vicinity of the inner surface can be ensured, wherefore a particularly effective change in the surface property of the inner surface can be ensured without having to provide the entire volume of the inner hose layer with the surface-modifying substance, which results in cost savings.

In an example, the inner hose layer formed from a plastic comprises a plastic matrix, in which the surface-modifying substance is embedded in a diffusion-resistant manner, wherein the plastic matrix is adapted to reduce, in particular to prevent, the release of the surface-modifying substance into the fluid that is conductable through the fluid hose.

This achieves the technical advantage that the plastic matrix enables a diffusion-resistant embedding of the surface-modifying substance within the plastic, so that during the service life of the fluid hose, the surface-modifying substance does not escape, or only to an extremely small extent, from the plastic of the inner hose layer.

In an example, the plastic of the inner hose layer comprises an elastomer, a thermoplastic elastomer (TPE), a thermoplastic elastomer vulcanizate (TPE-V), acrylonitrile butadiene rubber (NBR), natural rubber (NR), ethylene propylene diene rubber (EPDM), isobutene-isoprene rubber (IIR), methyl vinyl silicone rubber (VMQ) and/or a flexible fluorothermoplastic (THV) made of thermoplastic elastomer (TPE), hexafluoropropylene (HFP) and polyvinylidene fluoride (VDF), wherein the plastic of the inner hose layer in particular comprises a peroxide-crosslinked thermoplastic elastomer vulcanizate (TPE-V).

This achieves the technical advantage that the above-mentioned plastics of the inner hose layer not only have an effective resistance to different fluids conducted through the fluid hose, but also ensure an particularly outstanding, diffusion-resistant embedding of the surface-modifying substance in the respective plastic in such a way that the surface modifying substance cannot, or only to a very small extent, diffuse from the respective plastic of the inner hose layer into the fluid.

The plastics mentioned for the inner hose layer comprise in particular a single plastic or a plurality of different plastics.

The plastic of the inner hose layer can include a plastic, in particular a polyolefin and/or polyamide, in particular polyethylene, high-density polyethylene (HDPE) or polypropylene.

The plastic of the inner hose layer can include a thermoplastic elastomer (TPE), in particular a mixture of polyamide (PA) or polyolefin, in particular polypropylene (PP) or polyethylene (PE) or styrene block copolymers, preferably styrene-ethylene-butylene-styrene (SEBS), with ethylene propylene diene rubber (EPDM), isobutene isoprene rubber, acrylonitrile butadiene rubber (NBR), hydrogenated acrylonitrile butadiene rubber (HNBR), and/or ethylene vinyl acetate rubber (EVM).

The plastic of the inner hose layer can comprise a thermoplastic elastomer vulcanizate (TPE-V), in particular a mixture of polyamide (PA) or polyolefin, in particular polypropylene (PP) or polyethylene (PE) or styrene block copolymers, preferably styrene-ethylene-butylene-styrene acrylonitrile butadiene rubber (NBR), hydrogenated acrylonitrile butadiene rubber (HNBR), and/or ethylene vinyl acetate rubber (EVM), which is vulcanized by the addition of a crosslinking agent.

In some examples, when using thermoplastic elastomer vulcanizate (TPE-V) as the plastic of the inner hose layer with peroxide-crosslinked thermoplastic elastomer vulcanizate (TPE-V) advantageous mechanical and diffusion-stable properties may be achieved such that no leaching in the fluid is detectable.

The peroxide-crosslinked thermoplastic elastomer vulcanizate (TPE-V) comprises in particular a peroxide derivative and/or a co-activator as crosslinking agent. The peroxide derivative comprises in particular an alkyl-aralkyl peroxide derivative, a diaralkyl peroxide derivative, a peroxyketal derivative and/or a peroxyester derivative. The co-activator here comprises in particular triallyl cyanurate (TAC), triallyl isocyanurate (TAIC), trimethylolpropane trimethacrylate (TRIM), dimethyl acrylate, trimethyl acrylate, triazine and/or bismaleimide.

In an example, the outer hose layer is formed from a plastic, wherein the plastic of the outer hose layer comprises an elastomer, a thermoplastic elastomer (TPE), a thermoplastic elastomer vulcanizate (TPE-V), acrylonitrile butadiene rubber (NBR), styrene butadiene rubber (SBR), natural rubber (NR), ethylene-propylene-diene rubber (EPDM), chloroprene rubber (CR), methyl vinyl silicone rubber (VMQ) and/or epichlorohydrin rubber (ECO).

This achieves the technical advantage that the materials mentioned ensure effective external resistance of the fluid hose to external influences, such as mechanical influences, temperature influences, and other influences.

The selections for an elastomer, a thermoplastic elastomer (TPE) and/or a thermoplastic elastomer vulcanizate (TPE-V) marked as advantageous for the plastic of the inner hose layer also apply without restriction as advantageous selections for the plastic of the outer hose layer.

In an example, the fluid hose comprises at least one reinforcement, which is arranged between the outer hose layer and the inner hose layer.

Alternatively and in particular, the outer hose layer itself can also be adapted as a reinforcement.

This achieves the technical advantage that the fluid hose achieves a particularly high pressure stability by using a reinforcement, so that fluids under high pressure can also be conducted through a corresponding fluid hose provided with a reinforcement without damaging the fluid hose.

In an example, the reinforcement is adapted as a single-layer or multi-layer reinforcement, and wherein the reinforcement in particular comprises a woven fabric, mesh fabric, braided fabric, knitted fabric and/or a spiralized textile insert.

This achieves the technical advantage that, depending on the pressure resistance requirements of the fluid hose, the optimal layer structure of the reinforcement or the optimal structure of the reinforcement can be selected.

In an example, the reinforcement comprises aromatic or aliphatic polyamide fibers, polyoxadiazole fibers, polyester fibers, polyphenylene sulfide fibers, aramid fibers, in particular meta-aramid fibers and/or para-aramid fibers, polyimide fibers, polyvinyl acetal fibers, polyetheretherketone fibers, or mixtures thereof.

This achieves the technical advantage that the fibers mentioned ensure a particularly high pressure resistance of the reinforcement.

In an example, the fluid hose comprises a first intermediate layer, which is arranged between the outer hose layer and the reinforcement, and/or the fluid hose comprises a second intermediate layer, which is arranged between the inner hose layer and the reinforcement.

This achieves the technical advantage that the first or second intermediate layer enables the reinforcement to be effectively embedded in the hose structure of the fluid hose. The first or second intermediate layer thus ensures, for example, that the inner hose layer or the outer hose layer of the fluid hose is not damaged if the reinforcement is deformed as a result of high pressure peaks. In particular, the first and/or second intermediate layer comprises an elastomeric material which is adapted to absorb deformation of the reinforcement.

In addition, the use of the first intermediate layer between the outer hose layer and the reinforcement and the use of the second intermediate layer between the inner hose layer and the reinforcement can optimize an effective adhesive bond of the reinforcement with the respective adjacent layers.

In an example, the first intermediate layer and/or second intermediate layer comprises an elastomer, a thermoplastic elastomer (TPE), a thermoplastic elastomer vulcanizate (TPE-V), acrylonitrile butadiene rubber (NBR), styrene butadiene rubber (SBR), natural rubber (NR), ethylene propylene diene rubber (EPDM), chloroprene rubber (CR), methyl vinyl silicone rubber (VMQ) and/or epichlorohydrin rubber (ECO).

This achieves the technical advantage that the materials mentioned allow for an effectively embedding the reinforcement in the hose structure and also ensure good adhesion with the reinforcement and the inner hose layer or the outer hose layer.

The selections marked as advantageous for the plastic of the inner hose layer for an elastomer, a thermoplastic elastomer (TPE) and/or a thermoplastic elastomer vulcanizate (TPE-V) also apply without restriction as advantageous selections for the plastic of the first and/or second intermediate layer.

In an example, the inner hose layer has a thickness of 0.2 mm to 2 mm, preferably 0.2 mm to 1 mm, more preferably 0.2 mm to 0.5 mm, even more preferably 0.2 mm.

As a result, the technical advantage is achieved that the inner hose layer can be formed with a very small thickness, which significantly reduces the dimensions and thus the manufacturing costs of the fluid hose. Despite the relatively small thickness of the inner hose layer, effective resistance to the fluid conducted through the fluid hose is nevertheless ensured.

In an example, the fluid hose is adapted as an extruded component, wherein the outer hose layer in particular is extruded radially outside onto the inner hose layer.

This achieves the technical advantage, for example, that a fluid hose produced as an extruded component can be produced easily and inexpensively, in particular with a flexible shape.

According to a second aspect of the application, the object is solved by a method for producing an at least two-layer fluid hose, wherein the method comprises the following method steps: providing a plastic, providing a surface-modifying substance, mixing the plastic with the surface-modifying substance on a specific carrier material, in order to ensure optimal distribution and dosing of the surface-modifying substance, melting the mixture comprising the plastic and the surface-modifying substance, in order to obtain a plastic melt, extruding the plastic melt, in order to obtain an inner hose layer made of plastic, wherein the surface-modifying substance is embedded within the plastic in a diffusion-resistant manner, providing a further plastic, melting the further plastic to obtain a further plastic melt, extruding the further plastic melt, in order to obtain an outer hose layer arranged radially outside on the inner hose layer, and to produce the at least two-layer fluid hose.

This achieves the technical advantage, for example, that a particularly effective distribution of the surface-modifying substance within the plastic can be ensured in the plastic melt, and that the subsequent cooling of the plastic melt during the extrusion process ensures that the surface-modifying substance is advantageously embedded in the plastic of the inner hose layer. The extrusion process allows the fluid hose to be produced in large numbers and at low cost, and the shape of the fluid hose can also be selected flexibly.

The examples described for the fluid hose according to the first aspect are also examples for the method for producing a fluid hose according to the second aspect.

BRIEF DESCRIPTION OF THE DRAWINGS

Examples of the application are shown in the drawings and are described in more detail below.

They show.

DETAILED DESCRIPTION

Figure 1:
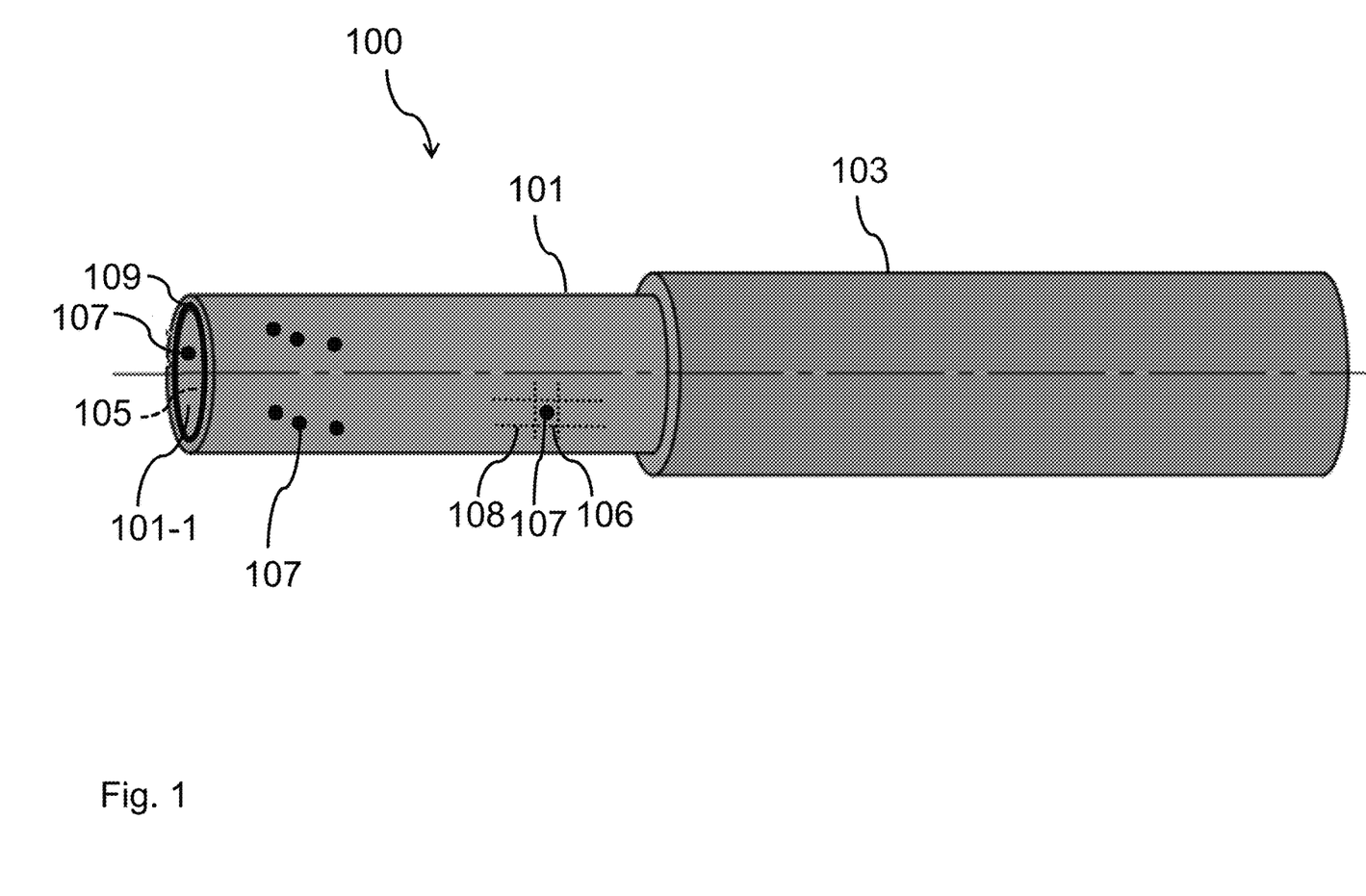
FIG. 1 a schematic view of a fluid hose according to a first example.

FIG. 1 shows a schematic view of a fluid hose according to a first example. The fluid hose 100 for conducting fluid is adapted in particular as a liquid hose 100 for conducting liquid.

The liquid hose 100 can be adapted as a water hose for conducting aqueous liquid. The liquid hose 100 can be adapted as a drinking water hose for conducting drinking water.

As shown in FIG. 1, the fluid hose 100 according to the first example comprises an inner hose layer 101 and an outer hose layer 103 arranged radially outside of the inner hose layer 101. The inner hose layer 101 has an inner surface 101-1 facing the interior 105 of the fluid hose 100. The inner hose layer 101 encloses the interior 105 of the fluid hose 100.

The present application is based on the problem that in the case of conventional fluid hoses, for example water hoses for conducting fluid, for example aqueous liquid, a high germ load can often occur in the conducted fluid. This is especially the case when an aqueous liquid increases is conducted through corresponding conventional water hoses at elevated temperature, and/or when an aqueous liquid stands in the corresponding conventional water hoses for an extended period of time without sufficient movement.

A high germ load that often occurs in conventional fluid lines, for example water hoses, results from the strong proliferation of microorganisms, such as bacteria, algae, fungi, viruses and/or protozoa, under environmental conditions that are favorable for the microorganisms, such as an optimal temperature for the microorganisms.

With a conventional water hose, the problem often arises that a biofilm can form in the water taken up in the water hoses. Such a biofilm is formed by the microorganisms present in the water. Such a biofilm, which has a concentration of the microorganisms, can form in particular on an inner surface of the conventional water hose. Due to a corresponding biofilm on the inner surface of corresponding conventional water hoses, further contamination of water subsequently conducted through the water hose by the microorganisms is possible even after a complete replacement of the water contained in the water hose.

In order to prevent the occurrence of a biofilm or to significantly reduce the amount of biofilm formed, the fluid hose 100 according to the present application comprises a surface-modifying substance 107, which modifies a surface property of the inner surface 101-1 of the inner hose layer 101 of the fluid hose 100 in such way to prevent, in particular significantly reduce, colonization of the inner surface 101-1 by microorganisms.

Within the plastic of the inner hose layer 101 of the fluid hose 100, the surface-modifying substance 107 is embedded in a diffusion-resistant manner, wherein the embedded surface-modifying substance 107 is only shown schematically in FIG. 1. The plastic of the inner hose layer 101 cannot, or only to an extremely small extent, be penetrated by the surface-modifying substance 107, so that the surface-modifying substance 107 is not, or only to an extremely small extent, released into the fluid conducted through the fluid hose 100 and is thus remains in the plastic of the inner hose layer 101.

As shown only schematically in FIG. 1, the inner hose layer 101 formed from a plastic comprises, in particular, a plastic matrix 108 with matrix receptacles 106, in which the surface-modifying substance 107 is embedded in a diffusion-resistant manner, wherein the plastic matrix 108 is adapted to prevent or significantly reduce a release of the surface-modifying substance 107 into the fluid conducted through the fluid hose 100.

Thus, the surface-modifying substance 107 does not have a direct toxic effect on microorganisms in the fluid hose 100, but rather modifies the surface properties of the inner surface 101-1 of the inner hose layer 101 of the fluid hose 100 in such a way that colonization of the inner surface 101-1 by microorganisms is prevented or greatly reduced.

In particular, the surface-modifying substance 107 is embedded throughout the inner hose layer 101 formed of plastic.

Alternatively, the surface-modifying substance 107 is embedded in particular in an area 109 of the inner hose layer 101 formed from plastic facing the inner surface 101-1, wherein the area 109 is delimited by the inner surface 101-1 and extends from the inner surface 101-1 towards the outer hose layer 103.

In this case, the area 109 does not extend completely from the inner surface 101-1 of the inner hose layer 101 to the edge of the inner hose layer 101 which bears against the outer hose layer 103. The area 109 thus comprises only a thin section of the radially inner part of the inner hose layer 101, which runs around the inner surface 101-1 and which is in contact with the fluid conducted in the interior 105.

In particular, the area 109 delimited by the inner surface 101-1 and extending from the inner surface 101-1 towards the outer hose layer 103 has a thickness of between 1 nm and 100 μm, in particular between 1 nm and 10 μm, in particular between 1 nm and 1 μm, in particular between 1 nm and 100 nm, and is therefore significantly thinner than the entire thickness of the inner hose layer 101.

In particular, the surface-modifying substance 107 comprises a surface-polarizing substance 107, which is adapted to change a polarization of the inner surface 101-1 of the inner hose layer 101 in order to prevent or greatly reduce colonization of the inner surface 101-1 by microorganisms.

In particular, changing the polarization of the inner surface 101-1 results in a bipolarly polarized inner surface 101-1 in order to prevent or greatly reduce colonization of the inner surface 101-1 by microorganisms.

A corresponding bipolarly polarized inner surface 101-1 of the inner hose layer 101 has both positive partial charges and negative partial charges, which impair microorganisms adhering to the inner surface 101-1.

In particular, the surface-modifying substance 107, in particular surface-polarizing substance 107, comprises a sterion substance which is adapted to prevent or significantly reduce colonization of the inner surface 101-1 by microorganisms, wherein the sterion substance in particular comprises an organometallic compound.

A sterion substance comprising an organometallic compound can be obtained from SteriOne GmbH & Co. KG, Berlin, Germany. In particular, a batch can be used in which the organometallic compound is used with a specific carrier material in order to ensure optimal distribution and dosing of the organometallic compound in the plastic of the inner hose layer 101.

An organometallic compound in this case comprises in particular a metal, in particular a transition metal, in particular copper, which provides a positive partial charge in the organometallic compound, and one or a plurality of organic ligands which provides a partial negative charge in the organometallic compound, in order to achieve an effective polarization of the inner surface 101-1 of the inner hose layer 101.

The at least one organic ligand of the organometallic compound can in particular comprise heteroatoms, such as sulfur, nitrogen and/or oxygen, which provide a partial negative charge in the organometallic compound.

In particular, the organometallic compound comprises a copper thiolate compound, which is arranged in particular on a barium sulfate substrate.

The organometallic compound can be present in the inner hose layer 101 in a concentration range from 0.1 wt.-% to 1 wt.-%, in particular from 0.025 wt.-% to 0.1 wt.-%. Here, the specified concentration ranges relate to the weight of the organometallic compound in the inner hose layer 101 in relation to the sum of the weight of the plastic and the organometallic compound in the inner hose layer 101.

The sterion substance, which comprises an organometallic compound, differs from conventional antimicrobial agents, such as nanometals, such as silver, in that the sterion substance does not escape from the inner hose layer 101 into the fluid conducted in the interior 105 of the fluid hose 100, so that contamination of the fluid with antimicrobial agents is prevented, so that the corresponding fluid hose 100 can also be used in accordance with the biocide regulation in drinking water hoses. In addition, the effectiveness of the sterion substance does not decrease during the service life of the fluid hose 100, or decreases only to a small extent.

Thus, the sterion substance, which comprises an organometallic compound, can ensure a high antimicrobial effectiveness of the inner surface 101-1 of the fluid hose 100 during the service life of the fluid hose 100 without the sterion substance being released to the fluid conducted through the fluid hose 100.

In order to introduce the surface-modifying substance 107 into the inner hose layer 101 of the fluid hose 100, the plastic and the surface-modifying substance 107 are mixed with one another, in particular during the production of the inner hose layer 101, and then the inner hose layer 101 is formed from the mixture comprising the plastic and the surface modifying substance 107 in particular during an extrusion process.

The plastic of the inner hose layer 101 comprises in particular a single plastic or a plurality of different plastics.

The plastic of the inner hose layer 101 can comprise an elastomer, in particular a polyolefin and/or polyamide, in particular polyethylene, high-density polyethylene (HDPE) or polypropylene.

The plastic of the inner hose layer 101 can comprise a thermoplastic elastomer (TPE), in particular a mixture of polyamide (PA) or polyolefin, in particular polypropylene (PP) or polyethylene (PE) or styrene block copolymers, preferably styrene-ethylene-butylene-styrene acrylonitrile butadiene rubber (NBR), hydrogenated acrylonitrile butadiene rubber (HNBR), and/or ethylene vinyl acetate rubber (EVM).

The plastic of the inner hose layer 101 can comprise a thermoplastic elastomer vulcanizate (TPE-V), in particular a mixture of polyamide (PA) or polyolefin, in particular polypropylene (PP) or polyethylene (PE) or styrene block copolymers, preferably styrene-ethylene-butylene-styrene (SEBS), with ethylene propylene diene rubber (EPDM), isobutene isoprene rubber, acrylonitrile butadiene rubber (NBR), hydrogenated acrylonitrile butadiene rubber (HNBR), and/or ethylene vinyl acetate rubber (EVM), which is vulcanized by the addition of a crosslinking agent.

The plastic of the inner hose layer 101 can also comprise one of the following plastics, acrylonitrile butadiene rubber (NBR), natural rubber (NR), ethylene propylene diene rubber (EPDM), isobutene isoprene rubber (IIR), methyl vinyl silicone rubber (VMQ) and/or a flexible fluorothermoplastic (THV) made of thermoplastic elastomer (TPE), hexafluoropropylene (HFP) and polyvinylidene fluoride (VDF).

In particular, the plastic of the inner hose layer 101 comprises a peroxide-crosslinked thermoplastic elastomer vulcanizate (TPE-V).

The peroxide-crosslinked thermoplastic elastomer vulcanizate (TPE-V) of the inner hose layer 101 comprises in particular a peroxide derivative and/or a co-activator, wherein the peroxide derivative comprises in particular an alkyl aralkyl peroxide derivative, a diaralkyl peroxide derivative, a peroxyketal derivative and/or a peroxyester derivative, and/or wherein the co-activator comprises in particular triallyl cyanurate (TAC), triallyl isocyanurate (TAIC), trimethylolpropane trimethacrylate (TRIM), dimethyl acrylate, trimethyl acrylate, triazine and/or bismaleimide.

The plastic of the outer hose layer 103 can also comprise an elastomer, a thermoplastic elastomer (TPE) and/or a thermoplastic elastomer vulcanizate (TPE-V), wherein in particular the corresponding advantageous selections of elastomer, TPE and/or TPE-V mentioned for the inner hose layer 101 also apply as corresponding selections of elastomer, TPE and/or TPE-V of the outer hose layer 103.

The plastic of the outer hose layer 103 can also comprise one of the following plastics, acrylonitrile butadiene rubber (NBR), styrene butadiene rubber (SBR), natural rubber (NR), ethylene propylene diene rubber (EPDM), chloroprene rubber (CR), methyl vinyl silicone rubber (VMQ) and/or epichlorohydrin rubber (ECO).

Thus, by embedding the surface-modifying substance 107 in the plastic of the inner hose layer 101, microorganisms on the inner surface 101-1 of the inner hose layer 101 can be effectively impaired, and the formation of a biofilm in the fluid hose 100 can be prevented or significantly reduced.

The fluid hose 100 comprises in particular a drinking water hose or a service water hose, which can be used in a large number of applications, for example in the household sector or also in the industrial sector.

Alternatively, the fluid hose 100 can also include a water hose 100, which can be used in the vehicle sector, in particular in a water injection system of a motor vehicle, and/or in a battery temperature control system of a vehicle, in particular an electric vehicle.

Figure 2:
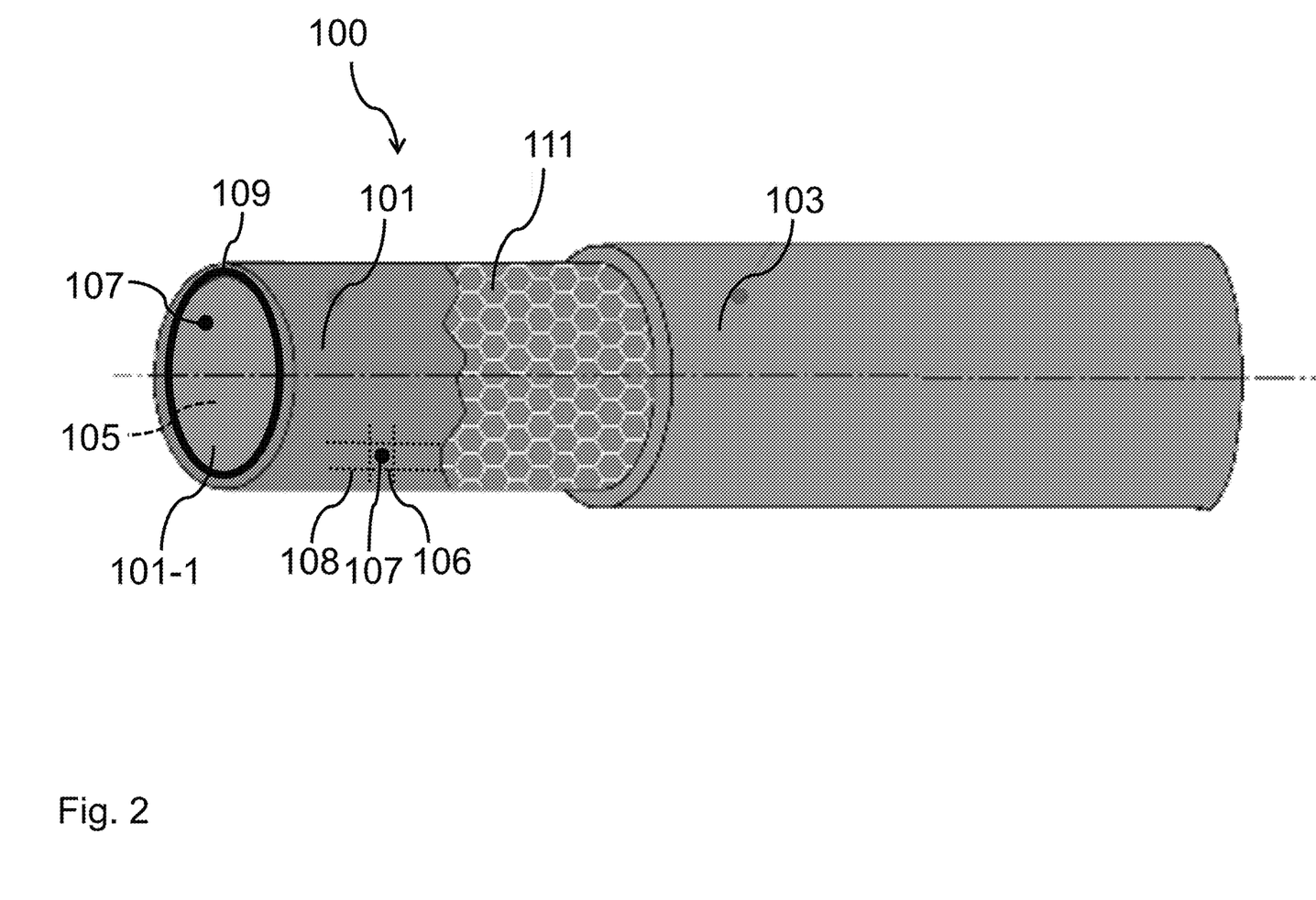
FIG. 2 a schematic view of a fluid hose according to a second example.

FIG. 2 shows a schematic view of a fluid hose according to a second example.

The fluid hose 100 shown in FIG. 2 according to the second example differs from the fluid hose 100 shown in FIG. 1 according to the first example only in that in the fluid hose 100 shown in FIG. 2 a reinforcement 111 is arranged between the inner hose layer 101 and the outer hose layer 103, which reinforcement 111 is adapted to absorb mechanical loads that occur due to the conduit of fluid at high pressure through the fluid hose 100. As a result, the fluid hose 100 according to the second example is also suitable for high-pressure applications.

The reinforcement 111 can be embodied as a single-layer or multi-layer reinforcement 111, wherein the reinforcement 111 comprises in particular a woven fabric, knitted fabric, braided fabric, meshed fabric, knitted fabric and/or a spiralized textile insert.

The reinforcement 111 can comprise aromatic or aliphatic polyamide fibers, polyoxadiazole fibers, polyester fibers, polyphenylene sulfide fibers, aramid fibers, in particular meta-aramid fibers and/or para-aramid fibers, polyimide fibers, polyvinyl acetal fibers, polyetheretherketone fibers, or mixtures thereof.

Even if this is not shown in FIG. 2, the fluid hose 100 can optionally comprise a first intermediate layer, which is arranged between the outer hose layer 103 and the reinforcement 111, and/or the fluid hose 100 can include a second intermediate layer, which is arranged between the inner hose layer 101 and the reinforcement 111.

The first intermediate layer and/or second intermediate layer enables the reinforcement 111 to be effectively embedded between the inner hose layer 101 and the outer hose layer 103 as part of an effective adhesive composite, and also allows for deformations of the reinforcement 111 to be absorbed by the corresponding intermediate layer.

Here, the first and/or second intermediate layer can comprise in particular an elastomer, a thermoplastic elastomer (TPE) and/or a thermoplastic elastomer vulcanizate (TPE-V), wherein the advantageous selection of an elastomer, a thermoplastic elastomer (TPE) and/or a thermoplastic elastomer vulcanizate (TPE-V) of the first and/or second intermediate layer correspond to the corresponding advantageous selections of elastomer, TPE and/or TPE-V of the inner hose layer 101.

Figure 3:
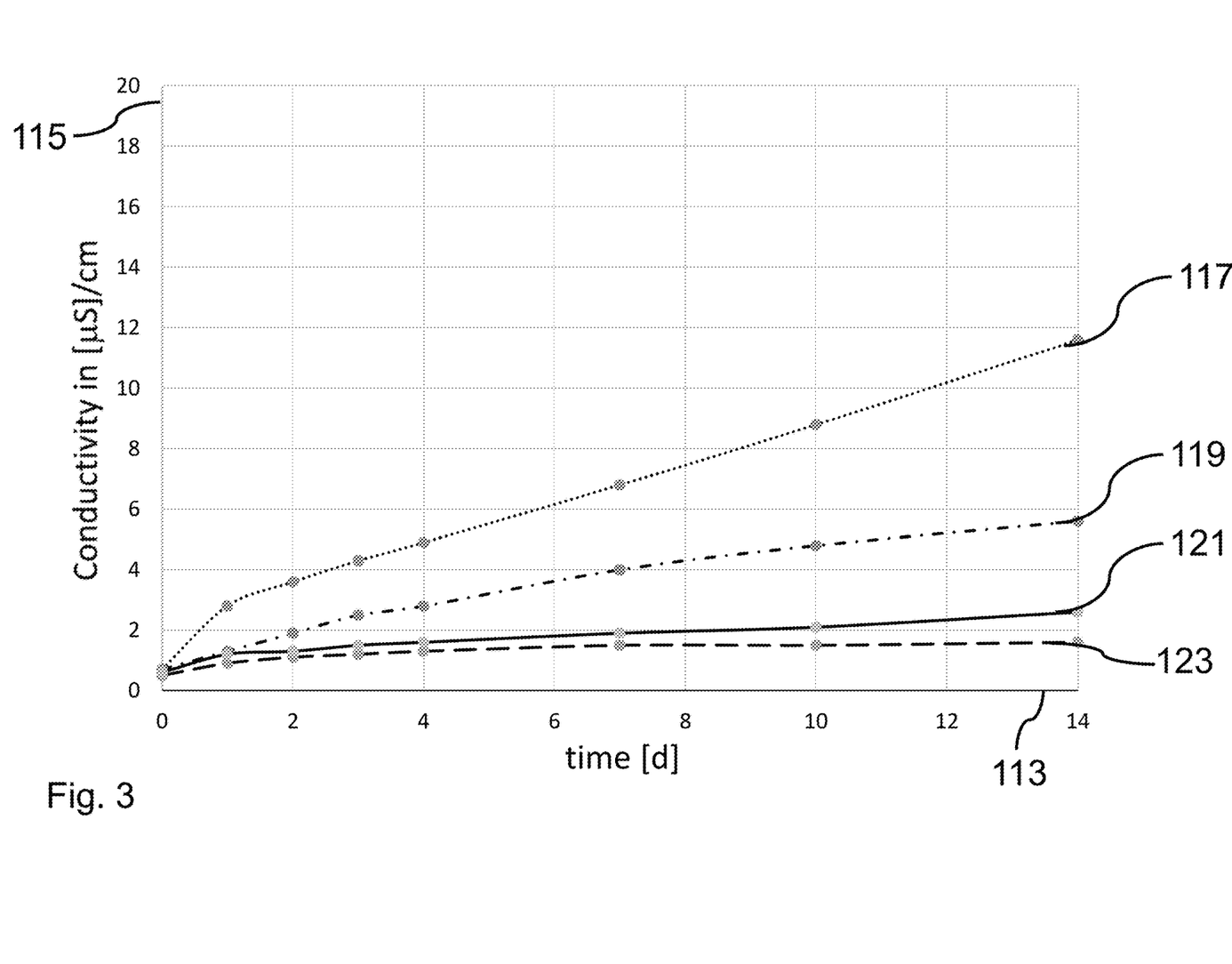
FIG. 3 a graphical representation of diffusion experiments related to different plastic materials.

FIG. 3 shows a graphical representation of diffusion experiments related to different plastic materials.

In the diffusion experiments shown in FIG. 3, different plastic materials were stored in a test solution consisting of distilled water in a wide-neck flask at a temperature of 80° C. and the increase in the electrical conductivity of the respective test solution was measured over a period of several days in order to draw conclusions in respect to the diffusion tendency of ions from the respective different plastic materials into the respective test solution.

The time in days (d) is plotted along the abscissa axis 113 shown in FIG. 3, and the electrical conductivity of the test solution in uS/cm is plotted along the ordinate axis 115 shown in FIG. 3.

The first curve 117 shown in FIG. 3 shows the course of the conductivity of the test solution with a sample of polyamide 66 (PA 66) thermoplastic stored therein over a period of 14 days.

The second curve 119 shown in FIG. 3 shows the course of the conductivity of the test solution with a sample of polyphenylene sulfide (PPS) thermoplastic stored therein over a period of 14 days.

The third curve 121 shown in FIG. 3 shows the course of the conductivity of the test solution with a sample of ethylene-propylene-diene rubber (EPDM) elastomer plastic stored therein over a period of 14 days.

The fourth curve 123 shown in FIG. 3 shows the course of the conductivity of the test solution with a sample of thermoplastic elastomer vulcanizate (TPV) plastic stored therein over a period of 14 days.

From FIG. 3, based on the relatively strong increase in electrical conductivity according to the first curve 117 and the second curve 119, it can be concluded that the ions present in the thermoplastics used, polyamide 66 (PA 66) and polyphenylene sulfide (PPS), have a relatively high tendency to diffuse into the respective test solution.

In contrast to this, the third curve 121 and the fourth curve 123 show a relatively small increase in electrical conductivity, so that the ions present in the ethylene-propylene-diene rubber (EPDM) and in the thermoplastic elastomer vulcanizate (TPV) have only diffused into the test solution to a very small extent even after a period of 14 days.

In addition, the elastomer plastic ethylene-propylene-diene rubber (EPDM) and the thermoplastic elastomer vulcanizate (TPV) are advantageously suitable for use in an inner hose layer 101 of a fluid hose 100 according to the first example shown in FIG. 1, or the second example shown in FIG. 2 due to the flexible properties, so that flexible fluid hoses 100 with a corresponding inner hose layer 101 can be obtained which have an extremely low tendency that ions contained in the corresponding plastics diffuse into the fluid conducted through the fluid hoses 100.

Here, the thermoplastic elastomer vulcanizate (TPV) according to the fourth curve 123 almost completely prevents a diffusion of ions from the plastic into the test solution during the examination period of 14 days and is therefore particularly suitable as a plastic for an inner hose layer 101 of a fluid hose 100.

Figure 4A:
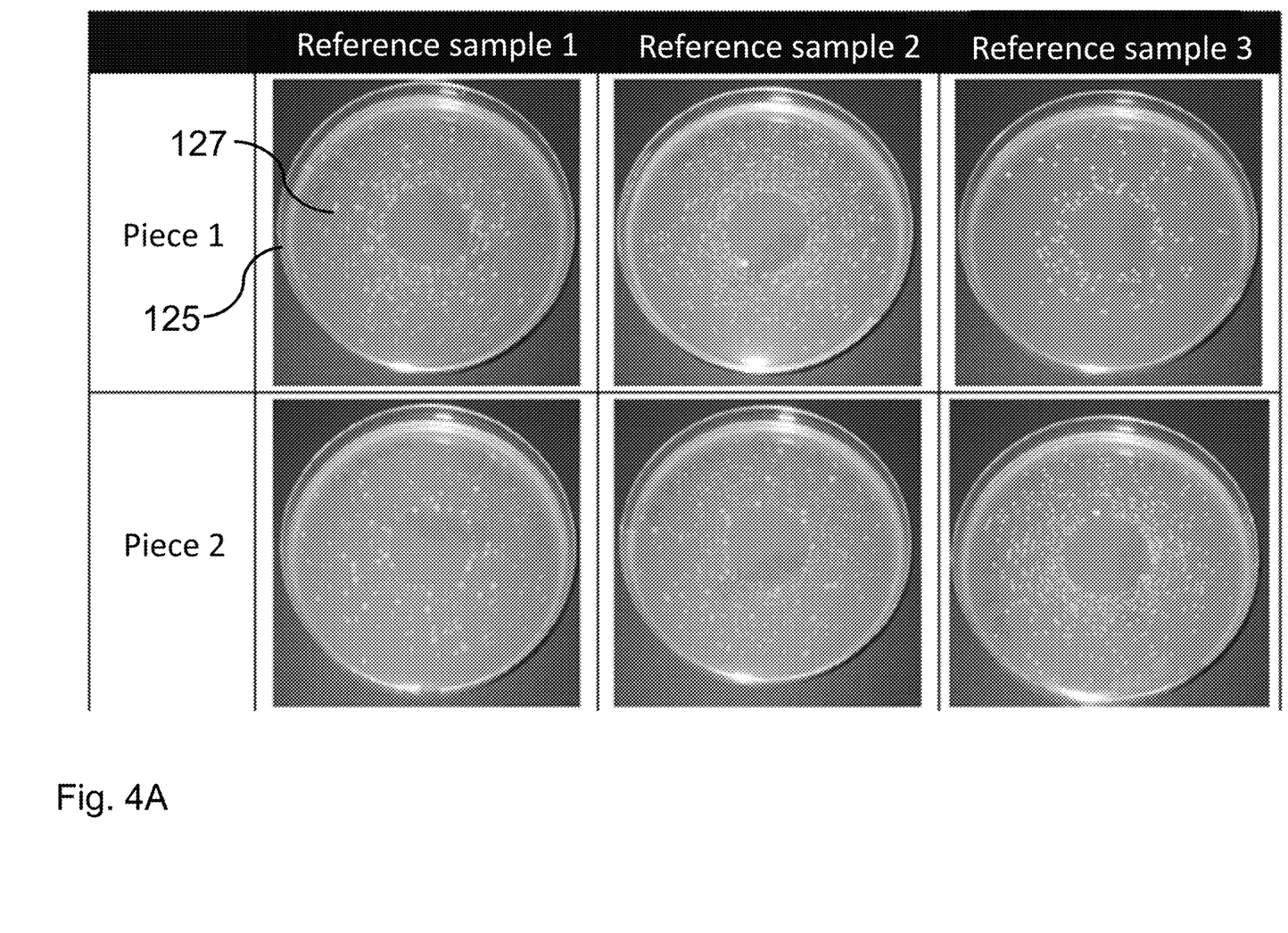
FIGS. 4A, 4B graphical representations of culturing experiments of microorganisms with respect to different plastic materials.
Figure 4B:
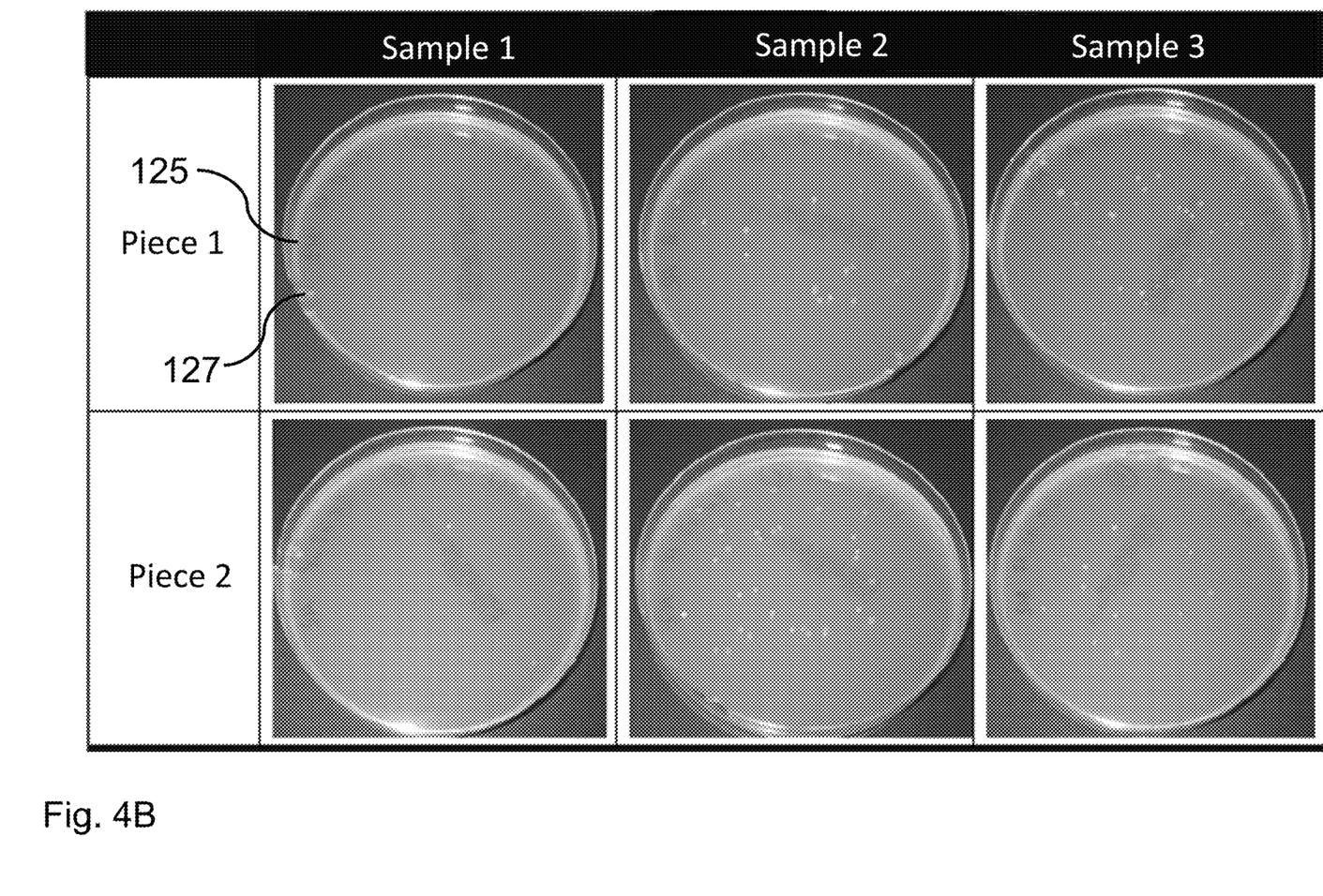

FIGS. 4A, 4B show graphical representations of cultivation experiments of microorganisms with respect to different plastic materials.

In order to investigate the antibacterial effect of plastic materials according to the present application, distilled water was stored at a temperature of 37° C. in containers made of different plastic materials for a period of 14 days. At the beginning of the 14-day period, the respective water volumes were inoculated with the bacterium *Pseudomonas aeruginosa* DSM 939 in order to stimulate bacterial growth within the respective containers.

After the period of 14 days, the containers were emptied, and sample pieces were cut out of the containers and respectively transferred into a test solution of distilled water in order to detach the biofilm adhering to the surface of the respective sample piece, which comprises the respective bacteria, and to transfer it into the respective test solution.

Subsequently, samples of the respective test solutions were respectively plated on PCA agar plates 125, and the PCA agar plates 125 were stored at 37° C. for 24 hours in order to initiate the growth of bacterial colonies 127 on the PCA agar plates 125. The PCA agar plates 125 and the bacterial colonies 127 are only marked as an example in FIGS. 4A and 4B. The number of bacterial cultures on the respective PCA agar plates was then counted and compared with one another in order to enable a comparison of the antibacterial effect of the plastic materials used.

Reference Sample 1, Reference Sample 2, and Reference Sample 3 shown in FIG. 4A relate to three different test samples cut from a single plastic container, wherein the plastic of the plastic container comprises high density polyethylene (HDPE). A duplicate experiment was performed for each test sample, as indicated by the labels "Piece 1" and "Piece 2" in FIG. 4A.

Sample 1, Sample 2, and Sample 3 shown in FIG. 4B relate to three different test samples cut from a single plastic container, wherein the plastic of the plastic container comprises high density polyethylene (HDPE) in which a organometallic copper compound as a surface modifying, or surface-polarizing substance 107, is added at a concentration of 0.045 wt.-% in respect to the end product.

A duplicate experiment was performed for each test sample, as indicated by the labels "piece 1" and "piece 2" in FIG. 4B.

In particular, the organometallic copper compound used in the experiments according to FIG. 4B comprises a copper thiolate compound on a barium sulfate carrier.

After counting the bacterial colonies 127 on the PCA agar plates 125 shown in FIGS. 4A and 4B, it can be seen that the PCA agar plates 125 of Samples 1, 2 and 3 shown in FIG. 4B compared to those PCA agar plates 125 of Reference Samples 1, 2 and 3 shown in FIG. 4A have a significantly reduced number of bacterial colonies 127. In particular, the reduction in the number of bacterial colonies 127 shown in FIG. 4B is more than 99% compared to the number of bacterial colonies 127 shown in FIG. 4A.

Thus, the use of the organometallic copper compound according to the experiments of FIG. 4B, in particular copper thiolate, in the plastic of the container causes a significant impairment of bacterial growth on the inner surface of the corresponding container, wherein the impairment is based on the surface-polarizing effect of the organometallic copper compound, in particular the copper thiolate.

In this case, the copper center of the organometallic copper compound provides a positive partial charge, wherein the corresponding ligands, in particular the thiolate residues, of the organometallic copper compound provide a negative partial charge, so that polarization, in particular bipolar polarization, of the plastic surface is achieved by the organometallic copper compound, which has a negative effect on the colonization of the plastic surface with microorganisms.

Figure 5:
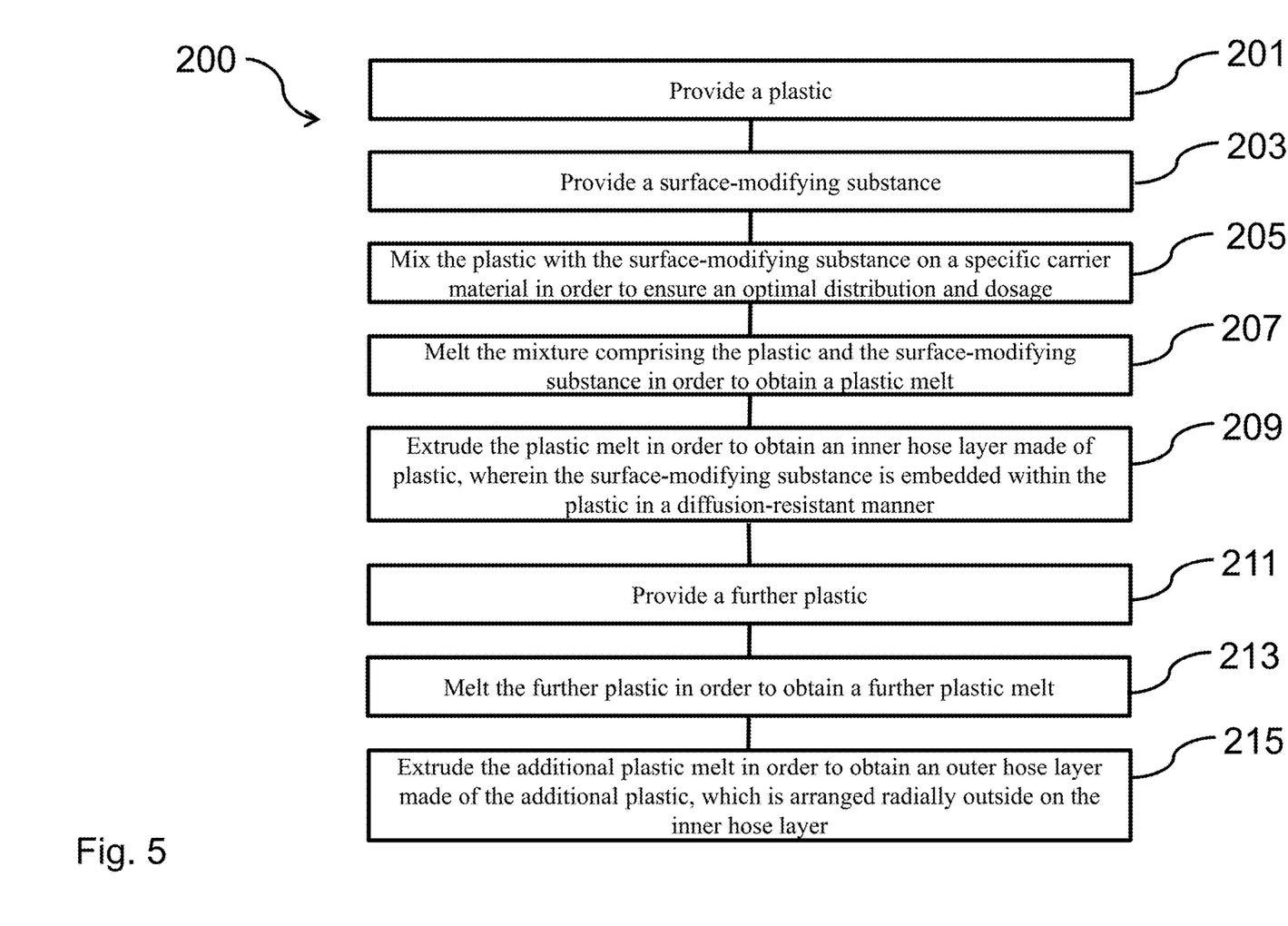
FIG. 5 a schematic illustration of a method for manufacturing a fluid hose according to the present application.

FIG. 5 shows a schematic representation of a method for producing a fluid hose.

The method 200 comprises providing 201 a plastic as the first method step and providing 203 a surface-modifying substance 107 as the second method step.

As a third method step, the method 200 comprises mixing 205 the plastic with the surface-modifying substance 107 on a specific carrier material in order to ensure an optimal distribution and dosage of the surface-modifying substance 107.

As a fourth method step, the method 200 comprises melting 207 the mixture comprising the plastic and the surface-modifying substance 107 in order to obtain a plastic melt.

The method 200 comprises, as a fifth method step, extruding 209 the plastic melt in order to obtain an inner hose layer 101 made of plastic, wherein the surface-modifying substance 107 is embedded within the plastic in a diffusion-resistant manner.

As a sixth method step, the method 200 comprises providing 211 of a further plastic.

The method 200 comprises, as the seventh method step, melting 213 of the further plastic in order to obtain a further plastic melt.

As the eighth method step, the method 200 comprises extruding 215 the additional plastic melt in order to obtain an outer hose layer 103 made of the additional plastic, which is arranged radially outside on the inner hose layer 101, in order to obtain the at least two-layer fluid hose 100.

Figure 6:
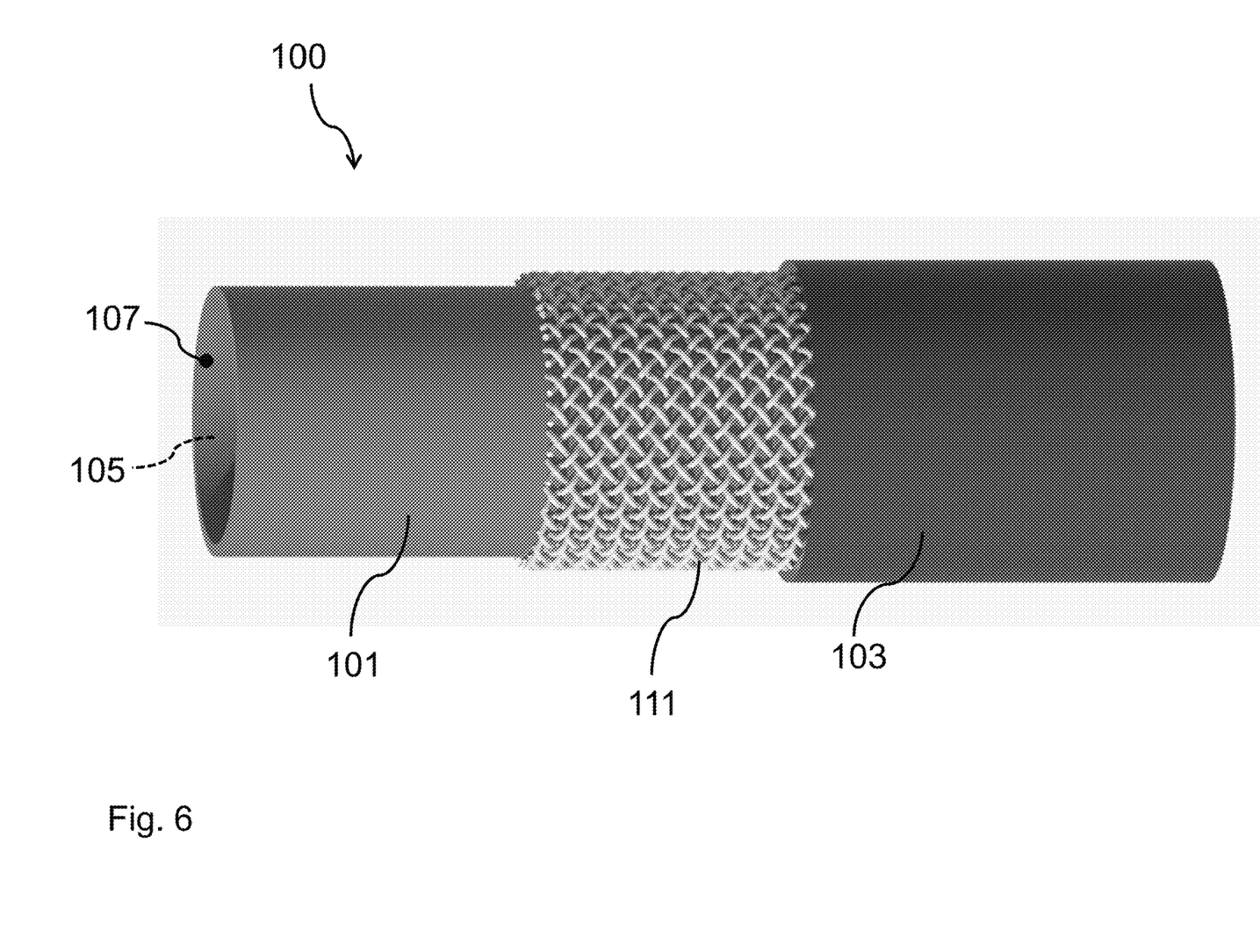
FIG. 6 a schematic view of a fluid hose according to a third example.

FIG. 6 shows a schematic view of a fluid hose according to a third example.

The fluid hose 100 shown in FIG. 6 according to the third example comprises, analogously to the fluid hose 100 according to the second example shown in FIG. 2, an inner hose layer 101, an outer hose layer 103 and a reinforcement 111 arranged between the inner hose layer 101 and the outer hose layer 103. In this case, the reinforcement 111 is adapted to absorb mechanical loads which occur as a result of the conduit of fluid through the fluid hose 100 at high pressure. As a result, the fluid hose 100 according to the second example is also suitable for high-pressure applications.

The reinforcement 111 can be embodied as a single-layer or multi-layer reinforcement 111, wherein the reinforcement 111 comprises in particular a woven, meshed, braided, knitted fabric and/or a spiralized textile insert.

The reinforcement 111 can comprise aromatic or aliphatic polyamide fibers, polyoxadiazole fibers, polyester fibers, polyphenylene sulfide fibers, aramid fibers, in particular meta-aramid fibers and/or para-aramid fibers, polyimide fibers, polyvinyl acetal fibers, polyetheretherketone fibers, or mixtures thereof.

The plastic of the inner hose layer 101 can comprise an elastomer, a thermoplastic elastomer (TPE) and/or a thermoplastic elastomer vulcanizate (TPE-V), wherein the plastic of the inner hose layer 101 in particular comprises a peroxide-crosslinked thermoplastic elastomer vulcanizate (TPE-V).

The plastic of the inner hose layer 101 can comprise in particular acrylonitrile butadiene rubber (NBR), natural rubber (NR), ethylene propylene diene rubber (EPDM), isobutene isoprene rubber (IIR), methyl vinyl silicone rubber (VMQ) and/or a flexible fluorothermoplastic (THV) of thermoplastic elastomer (TPE), hexafluoropropylene (HFP) and polyvinylidene fluoride (VDF).

The outer hose layer 103 is formed from a plastic, wherein the plastic of the outer hose layer 103 comprises an elastomer, a thermoplastic elastomer (TPE) and/or a thermoplastic elastomer vulcanizate (TPE-V).

The plastic of the outer hose layer 103 can comprise in particular acrylonitrile butadiene rubber (NBR), styrene butadiene rubber (SBR), natural rubber (NR), ethylene propylene diene rubber (EPDM), chloroprene rubber (CR), methyl vinyl silicone rubber (VMQ) and/or epichlorohydrin rubber (ECO).

In particular, the fluid hose 100 comprises an inner hose layer 101 made of acrylonitrile butadiene rubber (NBR) and an outer hose layer 103 made of acrylonitrile butadiene rubber (NBR).

Alternatively and in particular, the fluid hose 100 comprises an inner hose layer 101 made of acrylonitrile butadiene rubber (NBR) and an outer hose layer 103 made of styrene butadiene rubber (SBR).

Alternatively and in particular, the fluid hose 100 comprises an inner hose layer 101 made of natural rubber (NR) and an outer hose layer 103 made of natural rubber (NR).

Alternatively and in particular, the fluid hose 100 comprises an inner hose layer 101 made of ethylene propylene diene rubber (EPDM) and an outer hose layer 103 made of ethylene propylene diene rubber (EPDM).

Alternatively and in particular, the fluid hose 100 comprises an inner hose layer 101 made of isobutene-isoprene rubber (IIR) and an outer hose layer 103 made of chloroprene rubber (CR).

Alternatively and in particular, the fluid hose 100 comprises an inner hose layer 101 made of isobutene-isoprene rubber (IIR) and an outer hose layer 103 made of styrene-butadiene rubber (SBR).

Alternatively and in particular, the fluid hose 100 comprises an inner hose layer 101 made of isobutene-isoprene rubber (IIR) and an outer hose layer 103 made of natural rubber (NR).

Alternatively and in particular, the fluid hose 100 comprises an inner hose layer 101 made of methyl vinyl silicone rubber (VMQ) and an outer hose layer 103 made of methyl vinyl silicone rubber (VMQ).

Figure 7:
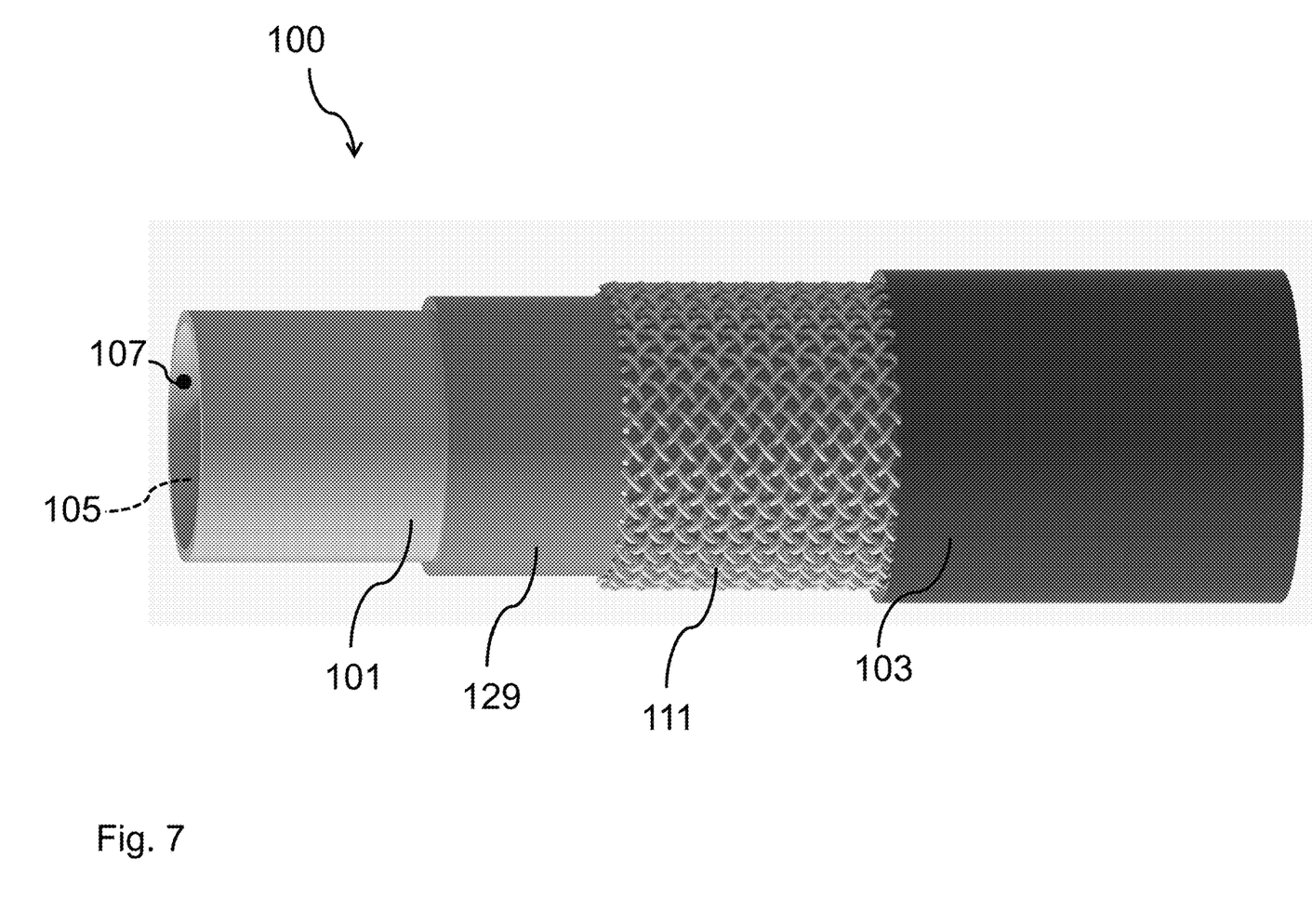
FIG. 7 a schematic view of a fluid hose according to a fourth example.

FIG. 7 shows a schematic view of a fluid hose according to a fourth example.

Like the fluid hose 100 shown in the third example according to FIG. 6, the fluid hose 100 according to FIG. 7 comprises an inner hose layer 101, an outer hose layer 103 and a reinforcement 111 arranged between the inner hose layer 101 and the outer hose layer 103.

In addition, the fluid hose 100 shown in FIG. 7 also comprises a second intermediate layer 129, which is arranged between the inner hose layer 101 and the outer hose layer 103.

For the materials of the inner hose layer 101, the outer hose layer 103 and the reinforcement 111, reference is made to the explanations regarding the fluid hose 100 according to FIG. 6.

The material of the second intermediate layer 129 comprises an elastomer, a thermoplastic elastomer (TPE) and/or a thermoplastic elastomer vulcanizate (TPE-V).

In particular, the material of the second intermediate layer 129 can also include acrylonitrile butadiene rubber (NBR) and/or epichlorohydrin rubber (ECO).

In particular, the fluid hose 100 comprises an inner hose layer 101 made of flexible fluorothermoplastic (THV) made of thermoplastic elastomer (TPE), hexafluoropropylene (HFP) and polyvinylidene fluoride (VDF), a second intermediate layer 129 made of acrylonitrile butadiene rubber (NBR) or epichlorohydrin rubber (ECO), and an outer hose layer 103 made of acrylonitrile butadiene rubber (NBR) or epichlorohydrin rubber (ECO).

Figure 8:
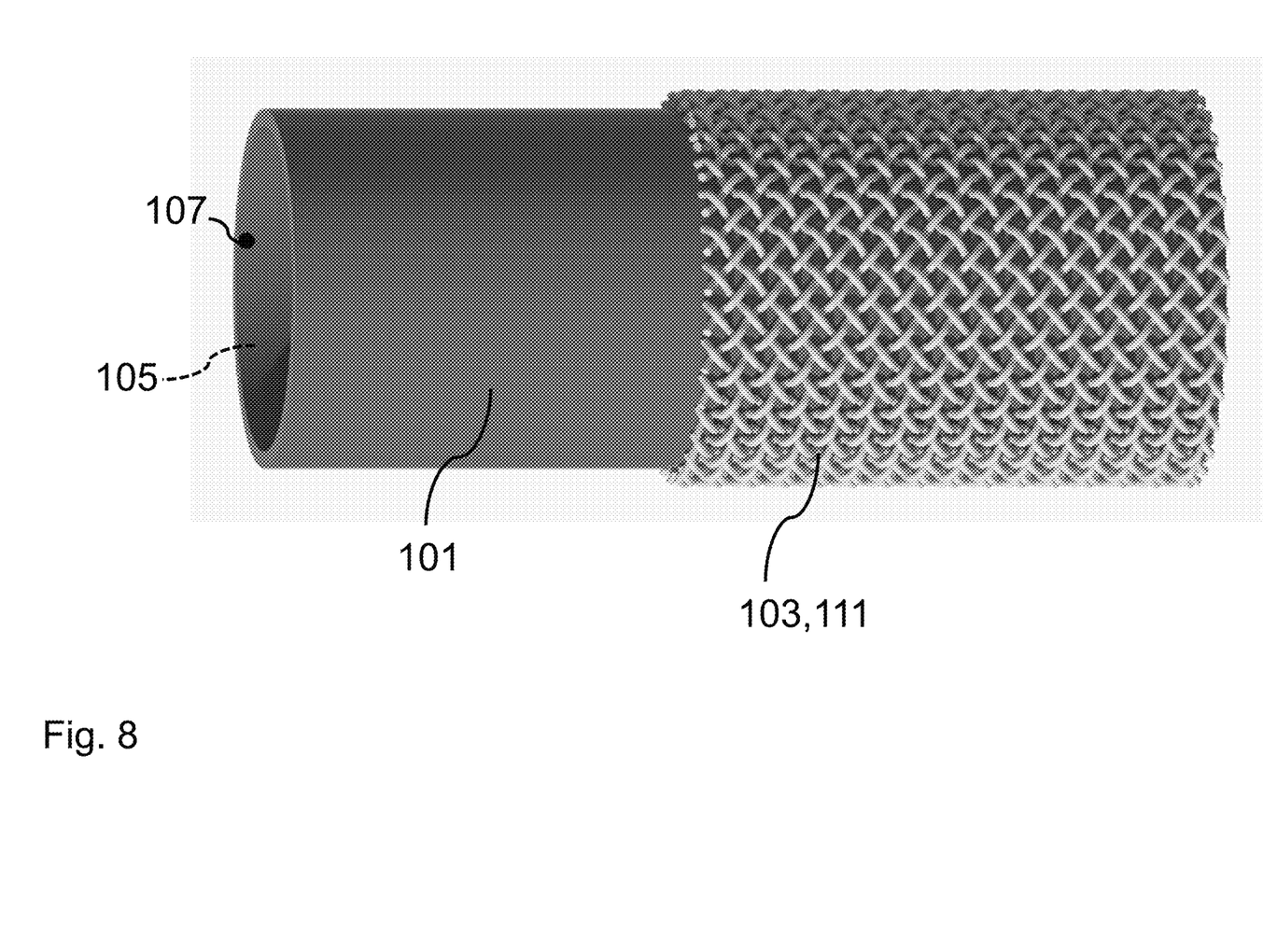
FIG. 8 a schematic view of a fluid hose according to a fifth example.

FIG. 8 shows a schematic view of a fluid hose according to a fifth example.

The two-layer fluid hose shown in FIG. 8 according to the fifth example comprises an inner hose layer 101 formed from plastic and an outer hose layer 103 adapted as a reinforcement 111.

For the possible selection of the materials for the inner hose layer 101 formed from plastic, reference is made to the explanations made above. For the possible selection of the materials of the outer hose layer 103 formed as a reinforcement 111, reference is made to the previous explanations in relation to the materials of the reinforcement 111.

All of the features explained and shown in connection with individual examples of the application can be provided in different combinations in the subject matter according to the disclosure in order to realize their advantageous effects at the same time.

The scope of protection of the present application is given by the claims and is not limited by the features explained in the description or shown in the figures.

REFERENCE NUMERALS 100 fluid hose
101 inner hose layer 101-1 inner surface of the inner hose layer
103 outer hose layer
105 interior of the fluid hose
106 matrix receptacles
107 surface-modifying substance
108 plastic matrix
109 area of the inner hose layer
111 reinforcement
113 abscissa axis
115 ordinate axis
117 first curve
119 second curve
121 third curve
123 fourth curve
125 PCA agar plate
127 bacterial colony
129 intermediate layer
200 method of producing a fluid hose
201 method step: providing a plastic
203 method step: providing a surface-modifying substance
205 method step: mixing the plastic with the surface-modifying substance
207 method step: melting the mixture
209 method step: extruding the plastic melt
211 method step: providing a further plastic
213 method step: melting the additional plastic to obtain an additional plastic melt
215 method step: extruding the additional plastic melt

The invention claimed is:

1. A fluid hose for conducting fluid, comprising:
an inner hose layer, wherein:
the inner hose layer encloses an interior of the fluid hose for receiving fluid,
the inner hose layer comprises an inner surface facing the interior of the fluid hose, and
the inner hose layer is formed from a plastic, wherein a surface-modifying substance is embedded within the plastic in a diffusion-resistant manner
wherein the surface-modifying substance is configured to change a surface property of the inner surface of the inner hose layer to prevent colonization of the inner surface by microorganisms, wherein the surface-modifying substance comprises a surface-polarizing substance configured to change a polarization of the inner surface of the inner hose layer, wherein the colonization of the inner surface by the microorganisms is prevented by the surface-polarizing substance, wherein the surface-polarizing substance comprises an organometallic compound that comprises a copper thiolate compound; and
an outer hose layer.

2. The fluid hose of claim 1, wherein the surface-polarizing substance in the inner hose layer is present in a concentration range from 0.01 wt.-% to 1 wt.-%.

3. The fluid hose of claim 1, wherein the surface-polarizing substance in the inner hose layer is present in a concentration range from 0.025 wt.-% to 0.1 wt.-%.

4. The fluid hose of claim 1, wherein the surface-modifying substance is embedded throughout the inner hose layer.

5. The fluid hose of claim 1, wherein the surface-modifying substance is embedded in an area of the inner hose layer that faces the inner surface, wherein the area is limited by the inner surface and extends from the inner surface towards the outer hose layer.

6. The fluid hose of claim 1, wherein the inner hose layer formed from the plastic comprises a plastic matrix, in which the surface-modifying substance is embedded in a diffusion-resistant manner, and wherein the plastic matrix is configured to prevent release of the surface-modifying substance into the fluid that is conductible through the fluid hose.

7. The fluid hose of claim 1, wherein the plastic of the inner hose layer comprises an elastomer, a thermoplastic elastomer (TPE), a thermoplastic elastomer vulcanizate (TPE-V), acrylonitrile butadiene rubber (NBR), natural rubber (NR), ethylene propylene diene rubber (EPDM), isobutene isoprene rubber (IIR), methyl vinyl silicone rubber (VMQ), a flexible fluorothermoplastic (THV) made from thermoplastic elastomer (TPE), hexafluoropropylene (HFP) and polyvinylidene fluoride (VDF), a peroxide-cross-linked thermoplastic elastomer vulcanizate (TPE-V), or any combination thereof.

8. The fluid hose of claim 1, wherein the outer hose layer is formed from a plastic, and wherein the plastic of the outer hose layer comprises an elastomer, a thermoplastic elastomer (TPE), a thermoplastic elastomer vulcanizate (TPE-V), acrylonitrile butadiene rubber (NBR), styrene butadiene rubber (SBR), natural rubber (NR), ethylene propylene diene rubber (EPDM), chloroprene rubber (CR), methyl vinyl silicone rubber (VMQ), epichlorohydrin rubber (ECO), or any combination thereof.

9. The fluid hose of claim 1, wherein the fluid hose comprises at least one reinforcement arranged between the outer hose layer and the inner hose layer.

10. The fluid hose of claim 9, wherein the at least one reinforcement is configured as a single-layer or multi-layer reinforcement, and wherein the at least one reinforcement comprises a woven fabric, mesh fabric, braided fabric, knitted fabric, a spiralized textile insert, or any combination thereof.

11. The fluid hose of claim 9, wherein the at least one reinforcement comprises aromatic or aliphatic polyamide fibers, polyoxadiazole fibers, polyester fibers, polyphenylene sulfide fibers, aramid fibers, meta-aramid fibers, para-aramid fibers, polyimide fibers, polyvinylacetal fibers, polyetheretherketone fibers, or mixtures thereof.

12. The fluid hose of claim 9, wherein the fluid hose comprises a first intermediate layer arranged between the outer hose layer and the at least one reinforcement, a second intermediate layer arranged between the inner hose layer and the at least one reinforcement, or both.

13. The fluid hose of claim 12, wherein the first intermediate layer, the second intermediate layer, or both, comprises an elastomer, a thermoplastic elastomer (TPE), a thermoplastic elastomer vulcanizate (TPE-V), acrylonitrile butadiene rubber (NBR), styrene butadiene rubber (SBR), natural rubber (NR), ethylene propylene diene rubber (EPDM), chloroprene rubber (CR), methyl vinyl silicone rubber (VMQ), epichlorohydrin rubber (ECO), or any combination thereof.

14. The fluid hose of claim 1, wherein the inner hose layer has a thickness of 0.2 mm to 2 mm.

15. The fluid hose of claim 1, wherein the inner hose layer has a thickness of 0.2 mm.

* * * * *